United States Patent [19]

Morgan et al.

[11] 4,061,711

[45] Dec. 6, 1977

[54] RECOVERY OF VANADIUM VALUES

[75] Inventors: Kenneth A. Morgan, Hoffman Estates; Robert R. Frame, Glenview, both of Ill.

[73] Assignee: UOP Inc., Des Plaines, Ill.

[21] Appl. No.: 735,704

[22] Filed: Oct. 26, 1976

[51] Int. Cl.$^2$ .............................................. C01G 31/00
[52] U.S. Cl. ........................................ 423/67; 423/68; 423/64; 423/592; 423/593
[58] Field of Search ...................... 423/67, 68, 543, 62, 423/64

[56] References Cited

U.S. PATENT DOCUMENTS

| 1,399,246 | 12/1921 | Bleecker | 423/68 |
| 2,298,091 | 10/1942 | Cooper et al. | 423/68 |
| 3,300,276 | 1/1967 | Bretschmeider et al. | 423/67 |

FOREIGN PATENT DOCUMENTS

| 885,925 | 11/1971 | Canada | 423/68 |
| 1,394,024 | 5/1975 | United Kingdom | 423/68 |

*Primary Examiner*—Herbert T. Carter
*Attorney, Agent, or Firm*—James R. Hoatson, Jr.; Raymond H. Nelson; William H. Page, II

[57] ABSTRACT

Vanadium values may be recovered by leaching a vanadium bearing material in which the vanadium is present as an oxide in its highest valence state in an ammoniacal medium at elevated temperatures and pressures followed by separation of the soluble ammonium metavanadate, precipitation and further separation to recover the desired vanadium values.

6 Claims, 1 Drawing Figure

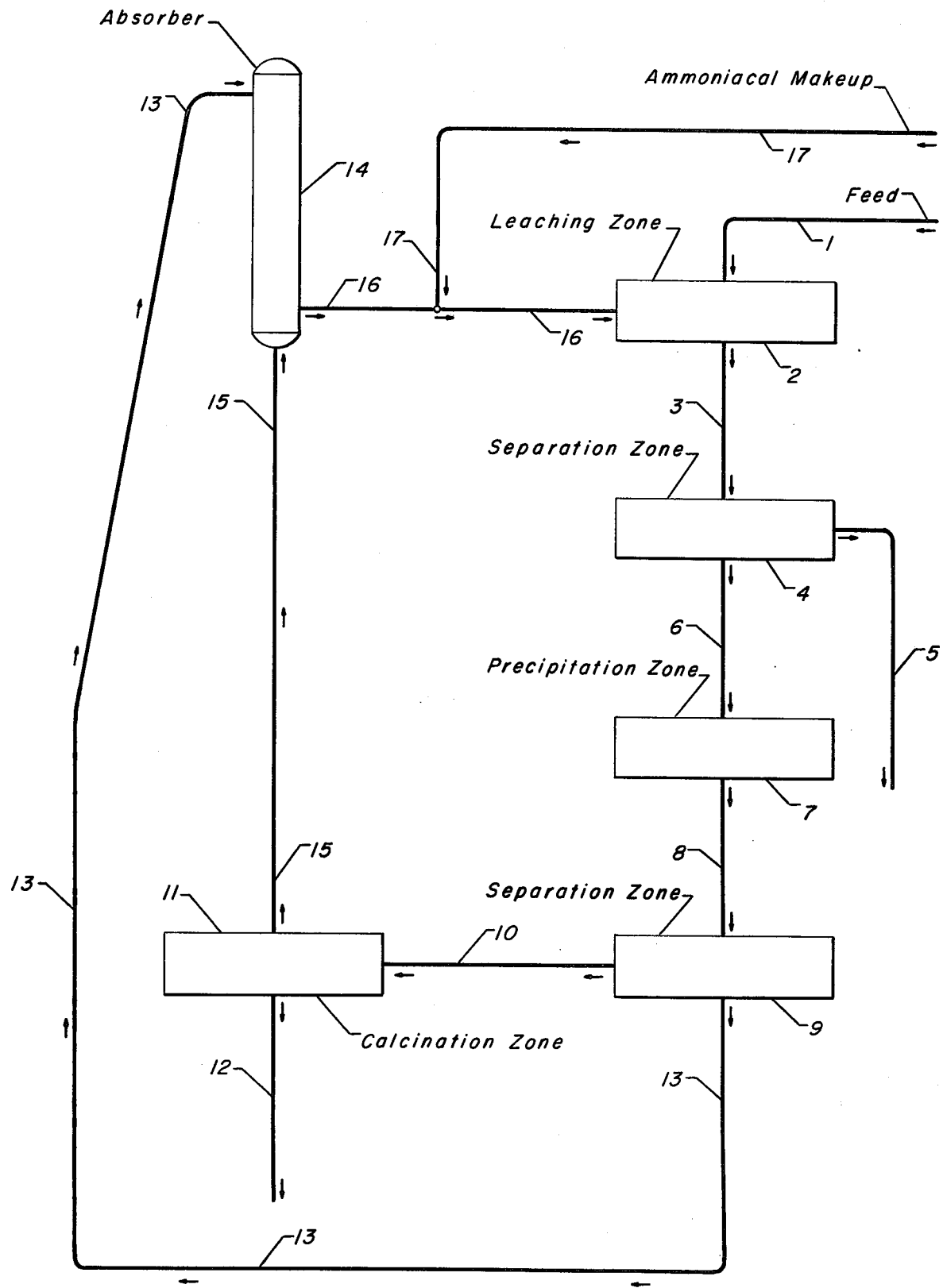

RECOVERY OF VANADIUM VALUES

BACKGROUND OF THE INVENTION

The obtention of vanadium values from vanadium-containing materials is effected in a wide variety of processes. For example, the vanadium-containing material can be subjected to the action of sulfuric acid, sodium hypochlorite, hydrochloric acid, nitric acid, etc. In addition, the prior art has also utilized certain ammonium salts such as ammonium chloride, ammonium sulfate, etc., as the precipitating agent whereby insoluble vanadium salts are formed. However, each of the prior art methods possesses certain disadvantages. For example, when utilizing acidic compounds such as hydrochloric acid, nitric acid, sulfuric acid, etc., the problem of clean-up of unwanted chemical compounds necessitates the use of relatively expensive and complicated apparatus in order to avoid the problem of polluting the environment. Furthermore, when utilizing ammonium salts such as ammonium chloride, ammonium sulfate, etc., the problem of an eventual buildup of chlorine or sulfate ions is present. This buildup is unwanted in view of the fact that the mother liquor will, after the caustic leach, eventually contain an amount of salts such as sodium chloride or sodium sulfate which are of insufficient caustic strength to take the vanadium into solution during the leaching operation.

A particular source of vanadium bearing materials may be obtained from the conversion of black oil to desired products. Black oil which may comprise the bottoms from a crude column or a vacuum tower is converted to lighter products such as distillate hydrocarbons which may be used as gasoline, jet fuel, fuel oil, gas oil, etc., in the presence of a catalyst comprising a vanadium sulfide precursor. In this conversion process using a vanadium-containing compound as a catalyst, the recycle stream resulting from the process is reinserted in the process flow stream at the beginning of the process. This recycle stream supplies a major portion of the catalyst to the process. However, the vanadium-containing material will tend to build up during the operation of the process which includes the aforementioned recycle stream. Therefore, a drag stream which is rich in vanadium is removed from the aforesaid recycle stream. This drag stream which is rich in vanadium values may be utilized as one source of vanadium, said drag stream itself being subjected to an oxidation process whereby the vanadium is present as an oxide in its highest valence form. However, in addition to the vanadium which is present, the drag stream or vanadium-containing source will also contain other metal impurities such as nickel, iron, etc. Therefore, to effect a more efficient operation with respect to the conversion of black oil it is necessary to remove these impurities in order that the vanadium catalyst will possess the desired activity level. As hereinafter set forth in greater detail, it will be shown that desired vanadium values may be obtained utilizing the novel process of the present invention.

This invention relates to a process for the recovery of vanadium values from vanadium-containing sources or materials. More specifically, the invention is concerned with an improvement in a process for the recovery of vanadium values whereby said vanadium may be recovered in a more economical and simple manner.

In addition to the use of vanadium as a catalyst for the conversion of black oil to lighter products, vanadium values such as vanadium metal or vanadium oxide are also useful for many purposes in the chemical industry. For example, vanadium metal may be used as the target material for X-rays, in the manufacture of steel or in the manufacture of vanadium compounds such as catalysts or alloys. Likewise, vanadium oxides such as vanadium pentoxide, are used as the starting material for other vanadium salts, as a catalyst for the oxidation of sulfur dioxide, as a catalyst for organic reactions, as a ceramic coloring material, for inhibiting ultra-violet transmission in glass, in black inks, in photographic developers, in dyeing textiles, in medicine, etc.

It is therefore an object of this invention to provide a process for recovering vanadium values from vanadium-containing sources.

A further object of this invention is found in an improvement in the process for obtaining vanadium values from vanadium-containing sources whereby the process may be effected in a more advantageous economic manner.

In one aspect an embodiment of this invention resides in a process for the recovery of vanadium values from a vanadium bearing source which comprises leaching said vanadium bearing source in an ammoniacal medium at an elevated temperature and pressure, separating the soluble ammonium vanadates from insoluble metal impurities, precipitating said soluble ammonium vanadates, separating the solid ammonium vanadates from the mother liquor, and recovering the desired vanadium values.

A specific embodiment of this invention is found in a process for the recovery of vanadium values from a vanadium bearing source which comprises leaching said vanadium bearing source in an ammoniacal medium at a temperature in the range of from about 50° to about 300° C. and a pressure in the range of from about 1 to about 200 atmospheres, separating the soluble ammonium vanadates from insoluble metal impurities, cooling said soluble ammonium vanadates to a temperature below about 50° C. to effect precipitation thereof, separating the resulting solid ammonium vanadates from the mother liquor and recovering the desired vanadium values.

Other objects and embodiments will be found in the following further detailed description of the present invention.

As hereinbefore set forth the present invention is concerned with a process for obtaining vanadium values from vanadium-containing sources in which the vanadium is present as an oxide in its highest valence state. Heretofore, vanadium-containing materials have been leached with caustic solution in order to solubilize the vanadium, the solubility being dependent upon the concentration of the caustic which is employed. Following this the vanadium was precipitated by acidification with an acid such as sulfuric acid, nitric acid, etc. However, this procedure consumes both the caustic and the acid in the neutralization step and therefore additional caustic and acid were required for subsequent leaching operations. In contradistinction to this procedure, we have now discovered that vanadium values may be recovered by leaching a vanadium bearing material in which the vanadium is present as an oxide in its highest valence state with an ammoniacal medium in which the ammonia is present in a range of from about 1 to about 14 molar, the preferred range being from about 2 to about 8 molar, at elevated temperatures and pressures. The relatively insoluble ammonium ortho- or metavanadate has a much greater solubility at elevated temperatures and pressure, thereby permitting substantial concentrations of vanadium to be recovered. Following the separation of the pregnant leach liquor from the tails the liquid filtrate is allowed to cool to a temperature below about 50° C., thereby precipitating ammonium ortho- or metavanadate which may be thereafter separated from the mother liquor. Alternatively, the pressure which is present may be reduced thereby allowing the soluble ammonium ortho- or metavanadate to precipitate out of solution. The solid vanadium product which is separated from the mother liquor may then be subjected to conventional means of metal recovery such as drying and calcination to form vanadium pentoxide. The vanadium-lean mother liquor may then be passed to an absorber where it is reconstituted with ammonia and water and recycled to form a portion of the ammoniacal media which is utilized to leach the vanadium oxide source.

The present invention will be further illustrated with reference to the accompanying drawing comprising a flow scheme which illustrates one embodiment of the process. It is to be understood that various valves, pumps, etc., have been eliminated as not being essential to the complete understanding of the present invention. Utilization of these, as well as other similar appurtenances will become obvious as the drawing is described.

A vanadium-containing or bearing material in which the vanadium is present as an oxide in its highest valence state is charged through line 1 to leaching zone 2. In leaching zone 2 the vanadium-containing material is contacted with an ammoniacal medium which may comprise gaseous ammonia, aqueous ammonium hydroxide, aqueous ammonium carbonate, etc. The leaching of the vanadium-containing material with the ammoniacal medium is effected at elevated temperatures and pressures which may range from about 50° to about 300° C. or more and at pressure ranging from about 1 to about 200 atmospheres. The amount of pressure which is employed may comprise the autogenous pressure of the reaction or, if so desired, the superatmospheric pressures may be afforded by the introduction of a substantially inert gas such as nitrogen, helium, argon, etc., into the leaching zone through means not shown in the drawing. The amount of pressure which is employed will preferably be that which is sufficient to maintain a major portion of the reactants in the liquid phase. After subjecting the vanadium-containing material, which also may contain other ammonia-insoluble impurities such as silica, iron, etc., in the leaching zone for a period of time which may range from about 0.5 up to about 10 hours or more, the residence time being dependent upon reaction parameters including temperature, pressure, amount of feed, etc., the resulting solution is withdrawn through line 3 and passed to separation zone 4. Separation zone 4 is maintained at a temperature approximately the same as that which is employed in leaching zone 2. In separation zone 4 the soluble ammonium vanadates are separated from the aforementioned non-alkali soluble impurities which may be in the form of tails by conventional means such as filtration, centrifugation, etc., the tails or solids being removed through line 5. After separation, the filtrate or liquid solution is withdrawn from separation zone 4 through line 6 and passed to precipitation zone 7. In precipitation zone 7, the liquid is cooled by conventional means including heat exchangers, ice baths, etc., to a temperature below about 50° C., the chilling of the solution resulting in the precipitation of solid ammonium vanadates. After precipitation, the mother liquor and solid ammonium vanadates are withdrawn from precipitation zone 7 through line 8 and passed to a second separation zone 9. This separation zone 9 may also comprise a filter, centrifuge, etc., whereby the solid ammonium vanadates are withdrawn from separation zone 9 through line 10 and passed to calcination zone 11. In calcination zone 11 the solid ammonium vanadates are calcined at a temperature of from about 250° to about 600° C. whereby the ammonium vanadates are converted from this form to vanadium pentoxide. The latter, namely, the vanadium pentoxide is withdrawn from calcination zone 11 through line 12 and passed to storage. The conversion of ammonium vanadates to vanadium pentoxide in calcination zone 11 will result in the formation of ammonia and water. These two compounds are withdrawn from calcination zone 11 through line 15 and passed to absorber 14 wherein they are admixed with the mother liquors which have been separated from ammonium vanadates in separation zone 9, the mother liquors being recycled to absorber 14 through line 13. In absorber 14, the ammonia and water are commingled with the mother liquor from the separation zone and recycled through line 16 back to leaching zone 2 for use as the leach liquor which treats the vanadium-containing material. If so desired, any additional ammoniacal make-up medium may be charged through line 17 and admixed with the recycle from absorber 14 in line 16.

While the drawing discloses one embodiment in which the solid vanadium values are withdrawn from separation zone 10 and subjected to calcination in calcination zone 11 it is also contemplated that any other methods for the recovery of the desired vanadium values including drying, washing, etc., may also be employed, without departing from the scope of this invention.

The following examples are given for purposes of illustrating the process of the present invention. However, it is to be understood that these examples are not intended to limit the generally broad scope of the present invention in strict accordance therewith.

EXAMPLE I

A calcined feed consisting of a mixture of metal values predominating in vanadium including nickel, iron, copper in which the metals are present as an oxide may be charged to a leaching zone which is maintained at a temperature of about 200° C. and the corresponding autogenous pressure. In the leaching zone, the feed is contacted with an ammoniacal medium in which the ammonia is present in a range of from about 1 to about 14 molar. The leaching operation may be effected for a period of 4 hours, at the end of which time the solution is withdrawn from the leaching zone and passed to a separation zone which is also maintained at the temperature of about 200° C. The pregnant mother liquor containing soluble ammonium metavanadate may be separated from the solid material which comprises ferric oxide predominantly which is insoluble in the ammoniacal medium. The tails may be withdrawn while the pregnant leach liquor may be passed to a precipitation zone which is maintained at a temperature of about 50° C. In the precipitation zone, the ammonium metavanadate precipitates out of the leach liquor and after precipitation the mixture of solid and liquid may be passed to a second separation zone. In this separation zone, the pregnant leach liquor may be separated from the solid ammonium metavanadate by filtration and thereafter is charged to an absorber. The solid ammonium metavanadate may be withdrawn from this separation zone and passed to a calcination zone wherein the ammonium metavanadate is calcined at a temperature of from about 250° to about 600° C. for a period of from about 0.5 to about 2.0 hours. The desired vanadium pentoxide may be recovered from this zone while the ammonia and water which is driven off by the calcination step may be passed to the absorber wherein it is admixed with the leach liquor and after admixture recycled back to the leaching zone.

EXAMPLE II

A calcined feed which consists of a mixture of metal values predominating in vanadium and iron in which the metals are present as oxides may be charged to a leaching zone which is maintained at a temperature of about 200° C. and the corresponding autogenous pressure. In this leaching zone the feed may be contacted with an ammoniacal medium in which the ammonia is present in a range of from about 1 to about 14 molar. The leaching operation may be effected for a period of about 4 hours, at the end of which time the solution may be withdrawn from the leaching zone and passed to a separation zone which is also maintained at a temperature of about 200° C. In the separation zone, the pregnant mother liquor which contains soluble vanadium compounds may be separated from the solid material which is predominantly ferric oxide. The tails may be withdrawn while the pregnant leach liquor may be passed to a precipitation zone which, as in the case of the leaching and separation zone, is also maintained at a temperature of about 200° C. In the precipitation zone, the vanadium will precipitate in the event that the separation zone is cooled in a manner similar to that set forth in Example I above or, alternatively, the pressure in the precipitation zone may be reduced while maintaining the temperature at about 200° C. In this event, the ammonia flashes out and is passed to an absorber. As the ammonia concentration of the pregnant liquor decreases, the vanadium may become insoluble and precipitate out. The resulting slurry may then be transferred to a second separation zone where the vanadium-lean liquor may be separated from the solid vanadium oxide product and thereafter may then be passed to an absorber for regeneration of the ammonia content.

EXAMPLE III

In this example a stirred autoclave which is fitted on the bottom with a filter element and below said filter element a valve line leading to a collection bomb was enclosed in a hot box. The charge which comprised 20.2 grams of vanadium pentoxide and 150 cc of 4.7 M ammonium hydroxide was loaded into the autoclave while the valve which was positioned below the filter element was in an off position. The autoclave was sealed, stirring was commenced, and the entire apparatus was brought up to a reaction temperature of about 140° C. The reaction was continued for a period of 18.5 hours, during which time the temperature was maintained in a range of from 141–148° C. while the pressure within the autoclave remained in a range of from 115–135 pounds per square inch gauge (psig). At the end of the reaction time, the valve was opened and the apparatus was allowed to stand with stirring for an additional period of 7.5 hours. During this time, heating was discontinued and the apparatus was allowed to return to room temperature. The collection bomb was removed and weighed. After weighing, the liquid was removed by decantation and the weight of the solid in the collection bomb was found to be 16 grams. The solid was removed from the collection bomb by treatment with an 8% sodium hydroxide solution. Analysis of the supernatant ammonium hydroxide solution disclosed that said solution was 0.22 M in vanadium. In addition, the sodium hydroxide solution was found to contain 5.78 grams of vanadium. Therefore, 64.7% of the total vanadium was passed through the filter element as a solution in hot ammonium hydroxide, the hot solution being approximately 1.1 M in vanadium.

EXAMPLE IV

In this example 20.2 grams of vanadium pentoxide and 150 cc of a 7.1 M ammonium hydroxide solution were loaded into an apparatus similar to that described in Example I above. The autoclave was sealed, stirring was commenced, and the apparatus was heated to reaction temperature. The mixture was stirred for a period of 18 hours, during which reaction period the temperature was maintained at from 144–146° C. At the end of this period, the valve was opened and filtration was allowed to take place for a period of 4 hours. At the end of this time, heating was discontinued and the apparatus was allowed to return to room temperature. The collection bomb was removed and treated in a manner similar to that set forth in Example III above, that is, the liquid was decanted and the solid was treated with an 8% sodium hydroxide solution. The supernatant ammonium hydroxide solution which was recovered from the collection bomb was found to be 0.31 M in vanadium. The sodium hydroxide solution was found to contain 4.45 grams of vanadium thus indicating that 59% of the vanadium was passed through the filter as a solution in the hot ammonium hydroxide, the hot solution being approximately 0.94 M in vanadium.

EXAMPLE V

In this example 24 grams of a high vanadium calcine, said calcine containing over 40% vanadium and about 5% each of iron and nickel, along with 150 milliliters of a 9.5 M ammonium hydroxide solution was placed in an autoclave similar to that employed in the above examples. The autoclave was sealed, stirred, and the entire apparatus was heated to reaction temperature. The reaction mixture was stirred for a period of 17 hours while maintaining the temperature in a range of from 143°–146° C. At the end of the 17-hour period, the valve was opened and the mixture was filtered for a period of 7 hours. At the end of the 7-hour period, the apparatus was allowed to cool to room temperature, the collection bomb was removed and the supernatant ammonium hydroxide solution was decanted. The remaining solid in the bomb was dissolved out of the bomb with an 8% sodium hydroxide solution. Analysis of the supernatant ammonium hydroxide solution disclosed it to be 0.43 M in vanadium and 0.12 M in nickel. The solid which remained contained 3.25 grams of vanadium and only trace quantities of iron and nickel. Based upon analysis of the original calcine a total of 60% of the vanadium, 87% of the nickel and a negligible amount of iron was leached. Thus it has been shown that iron may be separated from the mixture by utilizing the process described herein as well as effecting a separation of nickel from the bulk of the vanadium.

EXAMPLE VI

To an autoclave similar to that hereinbefore described were charged 29.6 grams of a calcine similar in nature to that described in Example V above and 150 cc of a 9.5 M ammonium hydroxide. The autoclave was sealed, stirring was commenced and the entire apparatus was brought up to an operating temperature of 193° C. Stirring was continued for a period of 3 hours while maintaining the temperature in a range of from 193°–199° C. At the end of this period, the valve at the bottom of the apparatus was opened and the mixture was filtered for a period of 12.5 hours while maintaining the desired operating temperature. Thereafter, the apparatus was cooled to room temperature, following which the collection bomb was removed and weighed. It was found that the weight had increased by 145 grams. The liquid was decanted and it was found that 23 grams of solid remained in the bomb. Analysis of the decanted liquid disclosed that it contained 2.3 grams vanadium, 0.64 grams of nickel and a negligible amount of iron. The solid was dissolved out of the bomb utilizing a sodium hydroxide solution. Analysis of the sodium hydroxide solution disclosed that it contained negligible quantities of iron and nickel and 7.5 grams of vanadium. Thus, the total concentration of vanadium in the hot solution was 1.6 M. Based upon analysis of the original calcine, a total of 81% of the vanadium, 53% of the nickel and negligible iron was leached out.

EXAMPLE VII

In a manner similar to that set forth in the above examples, an autoclave was loaded with 20.2 grams of vanadium pentoxide and 150 cc of 9.5 M ammonium hydroxide. The autoclave was sealed, stirring was commenced and the apparatus was heated to the operating temperature. The apparatus was maintained at a temperature in the range of from 197°–202° C. for a period of 2.5 hours accompanied by continual stirring of the mixture. Following this, the valve was opened and filtration was effected for a period of 12 hours while maintaining the aforementioned operating temperature. At the end of the 12-hour period, the apparatus was allowed to cool to room temperature and the collection bomb was removed. A reweighing of the collection bomb at this point disclosed that it had gained 155 grams. The supernatant liquid was decanted and found to weigh 119 grams, the weight of the solid which remained in the bomb being 36 grams. Analysis of the supernatant ammonium hydroxide solution disclosed that it was 0.12 M in vanadium. Sodium hydroxide solution was added to the solid and the resulting solution was found to contain 8.1 grams of vanadium. Thus, 78% of the vanadium was passed through the filter as a solution in the hot ammonium hydroxide, the hot solution being approximately 1.4 M in vanadium.

We claim as our invention:

1. A process for the recovery of vanadium values from a vanadium bearing source containing metal impurities wherein the vanadium is present in the form of an oxide in its highest valence state consisting of leaching said vanadium bearing source with an ammoniacal medium wherein ammonia is present in a range of from about 1 to about 14 molar at a temperature of from about 50° to about 300° C. and a pressure of from about 1 to about 200 atmospheres, separating the resultant ammonium vanadate solution from insoluble metal impurities, cooling said solution to below about 50° C. to precipitate solid ammonium vanadate and separating the latter from the mother liquor, calcining the separated solid ammonium vanadate at a temperature of from about 250° to about 600° C. to convert the same to vanadium pentoxide, and recovering said vanadium pentoxide.

2. The process as set forth in claim 1 in which said elevated pressure is the autogenous pressure of the reaction mixture.

3. The process as set forth in claim 1 in which an elevated pressure is provided for by the introduction of an inert gas.

4. The process as set forth in claim 3 in which said inert gas is nitrogen.

5. The process as set forth in claim 1 in which the effluent from the calcination step comprising ammonia and water is recycled to the leaching step of the process.

6. The process of claim 1 in which ammonia and $H_2O$ evolved in the calcining step are absorbed in said mother liquor and the thus enriched mother liquor is supplied to the leaching step as at least a portion of said ammoniacal medium.

* * * * *